US010412341B2

United States Patent
Ishii (10) Patent No.: US 10,412,341 B2
(45) Date of Patent: Sep. 10, 2019

(54) IMAGE DISPLAY DEVICE, FRAME TRANSMISSION INTERVAL CONTROL METHOD, AND IMAGE DISPLAY SYSTEM

(71) Applicant: NEC Display Solutions, Ltd., Tokyo (JP)

(72) Inventor: Eisaku Ishii, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/099,412

(22) PCT Filed: May 16, 2016

(86) PCT No.: PCT/JP2016/064458
§ 371 (c)(1),
(2) Date: Nov. 6, 2018

(87) PCT Pub. No.: WO2017/199284
PCT Pub. Date: Nov. 23, 2017

(65) Prior Publication Data
US 2019/0215480 A1 Jul. 11, 2019

(51) Int. Cl.
*H04N 5/445* (2011.01)
*H04N 5/44* (2011.01)
(Continued)

(52) U.S. Cl.
CPC ........... *H04N 7/0127* (2013.01); *G09G 5/005* (2013.01); *G09G 5/14* (2013.01); *H04N 5/44591* (2013.01);
(Continued)

(58) Field of Classification Search
CPC ........ H04N 7/0127; H04N 7/012; H04N 7/01; H04N 7/20; H04N 5/44; H04N 5/38;
(Continued)

(56) References Cited

U.S. PATENT DOCUMENTS

2007/0140398 A1\* 6/2007 Inoue ................... H04N 5/4401
375/372

FOREIGN PATENT DOCUMENTS

JP 2005-339256 A 12/2005
JP 2007-221805 A 8/2007
(Continued)

OTHER PUBLICATIONS

International Search Report (ISR) (PCT Form PCT/ISA/201), in PCT/JP2016/064458, dated Aug. 16, 2016.

*Primary Examiner* — Sherrie Hsia
(74) *Attorney, Agent, or Firm* — McGinn IP Law Group, PLLC.

(57) ABSTRACT

An image display device includes a communication device transmits a transmission request to each of the image transmission devices and receives a frame including differential data transmitted by each image transmission device in response to the transmission request. A measurement unit measures, for each image transmission device, a first required time interval, which is the time required from the start of transmission of the transmission request until the start of reception of the frame, and a second required time interval, which is the time required from the start of reception until the completion of reception of the frame. A control unit causes transmission requests to be sent to each of the image transmission devices at predetermined transmission intervals, causes measurement unit to measure the first and second required time intervals, and changes the transmission interval of the transmission request based on the measurement results.

6 Claims, 6 Drawing Sheets

(51) Int. Cl.
  *H04N 5/38*      (2006.01)
  *H04N 7/01*      (2006.01)
  *G09G 5/14*      (2006.01)
  *G09G 5/00*      (2006.01)
  *H04N 21/462*    (2011.01)

(52) U.S. Cl.
  CPC ..... *H04N 21/4622* (2013.01); *G09G 2370/02* (2013.01); *G09G 2370/20* (2013.01)

(58) Field of Classification Search
  CPC ...... H04N 5/4401; H04N 17/00; H04N 17/04; H04N 17/02; H04N 17/004; H04N 5/44543; H04N 5/44513; H04N 5/44591; H04N 21/482; H04N 21/4622; G09G 5/005; G09G 5/14; G09G 2370/02; G09G 2370/20
  USPC ....... 348/441, 723, 725, 180, 189, 563, 564, 348/569, 588, 584; 725/68, 67, 85, 98, 725/100, 118, 131, 139, 148, 151, 40, 43, 725/48
  See application file for complete search history.

(56) References Cited

FOREIGN PATENT DOCUMENTS

| | | |
|---|---|---|
| JP | 2008-152625 A | 7/2008 |
| JP | 2012-195629 A | 10/2012 |
| JP | 2015-080198 A | 4/2015 |

\* cited by examiner

No divisions

[Figure 2B]

Two divisions

[Figure 2C]

Three divisions
(differing areas)

[Figure 2D]

Four divisions

| $F_n$ | Number of frames F per second | Frame transmission interval T [s] |
|---|---|---|
| $F_{12}$ | 30 | 0.03333 |
| | 29 | 0.03448 |
| | 28 | 0.03571 |
| | 27 | 0.03704 |
| | 26 | 0.03846 |
| | 25 | 0.04000 |
| $F_{11}$ | 24 | 0.04167 |
| | 23 | 0.04348 |
| | 22 | 0.04545 |
| | 21 | 0.04762 |
| $F_{10}$ | 20 | 0.05000 |
| | 19 | 0.05263 |
| | 18 | 0.05556 |
| | 17 | 0.05882 |
| | 16 | 0.06250 |
| $F_9$ | 15 | 0.06667 |
| | 14 | 0.07143 |
| | 13 | 0.07692 |
| $F_8$ | 12 | 0.08333 |
| | 11 | 0.09091 |
| $F_7$ | 10 | 0.10000 |
| | 9 | 0.11111 |
| $F_6$ | 8 | 0.12500 |
| | 7 | 0.14286 |
| $F_5$ | 6 | 0.16667 |
| $F_4$ | 5 | 0.20000 |
| $F_3$ | 4 | 0.25000 |
| $F_2$ | 3 | 0.33333 |
| $F_1$ | 2 | 0.50000 |
| $F_0$ | 1 | 1.00000 |

IMAGE DISPLAY DEVICE, FRAME TRANSMISSION INTERVAL CONTROL METHOD, AND IMAGE DISPLAY SYSTEM

TECHNICAL FIELD

The present invention relates to an image display device that displays image data that are received from a plurality of image transmission devices, a frame transmission interval control method that is carried out in the image display device, and to an image display system that is provided with this image display device.

BACKGROUND ART

An image display system has been proposed that has a plurality of image transmission devices and an image display device that is communicably connected to these image transmission devices wherein the image display device displays image data that have been transmitted from each image transmission device. Patent Document 1 describes related art of such an image display system.

The image display device is provided with a display unit in which the display screen is partitioned into a plurality of divided display areas that correspond to each of the image transmission devices, and image data that are received from each image transmission device are displayed in a corresponding divided display area. The image display device transmits a transmission request of the image data to each image transmission device, and in accordance with the transmission request, each image transmission device transmits the image data to the image display device. The image display device transmits the transmission requests of the image data of the next frame to the image transmission devices at the timing of receiving a one-frame portion of image data.

The above-described image display system is used in, for example, a conference. In the form of use of, for example, a conference, a plurality of participants typically connect information processing terminals (image transmission devices) such as their own notebook personal computers or mobile terminals to a projector (image display device) by way of a network such as a LAN (Local Area Network). Each information processing terminal transmits data of images that are displayed on their own terminals to the projector in accordance with transmission requests from the projector. In some cases, the processing capability (CPU processing speed) of the information processing terminals differs for each participant.

However, because each image transmission device simultaneously sends image data to the image display device in the above-described image display system, pressure is placed on the network bandwidth, with the result that the communication speed decreases. In particular, using a network having comparatively narrow bandwidth in a mode of use such as a conference places extreme pressure upon the network bandwidth due to simultaneous transmission of image data by each image transmission device. Here, the network bandwidth indicates the amount of data transmitted per unit time.

The method described in Patent Document 2 is one method of preventing decrease of the communication speed of a network. In this method, an image transmission device compares two images that continue in time for an image that is displayed on the screen in a time series, extracts the portion in which change occurs, i.e., the differences of the images, and transmits to the image display device compressed data in which the difference data are compressed. If this method is applied in the above-described image display system, the amount of transmitted data per single frame that is transmitted by each image transmission device can be reduced, whereby decrease of the communication speed that occurs due to pressure upon the network bandwidth can be mitigated. The image transmission device is able to accumulate data that indicate the differences between a plurality of images that continue in time and then compress and transmit the accumulated differential data in accordance with transmission requests.

However, in the case described above, the amount of the differences changes in accordance with the range and content of the changes of the images that are displayed in the image transmission device, and together with this change, the amount of transmission of compressed data that are transmitted to the image display device also changes. When the amount of compressed data transmitted changes, the data transmission time per single frame also changes, with the result that the image updating of the divided display areas on the screen of the image display device becomes irregular. As a result, the updating of the image that is displayed in the divided display areas on the screen of the image display device is no longer in synchronization with the change of the image that is displayed on the image display device, and the users of the image transmission devices will therefore perceive unnatural display when viewing the display image on the image transmission device side and the display image on the image display device side.

In order to suppress this unnatural display, the image display device transmits a transmission request to each image transmission device at a fixed transmission interval such that the compressed data from each image transmission device can be received at a fixed period.

RELATED ART DOCUMENTS

Patent Documents

Patent Document 1: Japanese Unexamined Patent Application Publication No. 2008-152625
Patent Document 2: Japanese Unexamined Patent Application Publication No. 2005-339256

SUMMARY

However, an image display system that is configured such that the image display device transmits a transmission request to each image transmission device at a fixed time interval and each image transmission device transmits compressed data (differences) to the image display device in accordance with the transmission request has the problems as shown below.

The transmission interval of the transmission requests is fixed, and as a result, the transmission interval of frames of each image display device is also fixed. As a result, the continuous display of images for which the differences are small in the image transmission devices results in a state in which the amount of compressed data that are transmitted per single frame decreases and the transmission interval of frames becomes too great for the amount of data that are transmitted (a state of too few frames). In this case, the updating frequency of the images of the divided display areas of the image display device decreases compared to a case in which network bandwidth is used to the maximum.

On the other hand, if images for which the differences are great are displayed on an image transmission device, a state results in which the amount of compressed data transmitted per single frame increases, and the compressed data cannot be transmitted in the interval of a single frame due to the size of the image differences in some cases (a state in which frames are too fast). In this case, a phenomenon occurs that is referred to as frame dropping in which the compressed data cannot be transmitted smoothly.

Still further, the continuous display of the same image on an image transmission device results in a state in which frames occur for which compressed data are not sent due to the lack of differences between images and the transmission interval of frames therefore becomes too large. In this case, the image display device encounters difficulty in receiving compressed data at a fixed period.

Each image transmission device is able to obtain any of the above-described "state of too few frames," "state of frames that are too fast," and "state of too many frames." As a result, problems are encountered in achieving maximal use of the network bandwidth without waste to smoothly transmit compressed data at a fixed period.

It is an object of the present invention to provide an image display device, a frame transmission interval control method, and an image display system that enable maximum use of the network bandwidth without waste to smoothly transmit compressed data at a fixed period.

According to one aspect of the present invention for achieving the above-described object, an image display device is provided that is communicably connected by way of a network to a plurality of image transmission devices that each transmit differential data that indicate differences between images that are continuously displayed in time, the image display device including:

a communication unit that transmits a transmission request to each of the plurality of image transmission devices and that receives a frame that includes the differential data that is transmitted by each image transmission device in accordance with the transmission request;

a display unit that displays an image based on the differential data that is contained in the frame that is received from each of the image transmission devices;

a measurement unit that, for each of the image transmission devices, measures a first required time interval that is required from the start of transmission of the transmission request until the start of reception of the frame and a second required time interval that is required from the start of reception until the end of reception of the frame; and a control unit that controls a transmission operation of the transmission request of the communication unit;

wherein the control unit causes transmission of the transmission request from the communication unit to each of the image display devices at a transmission interval that has been set in advance, causes the measurement unit to carry out measurement of the first and second required time intervals for each of the image transmission devices, and changes the transmission interval of the transmission request based on a result of the measurement.

According to another aspect of the present invention, an image display system is provided that includes:

the above-described image display device; and the plurality of image transmission devices that are communicably connected to the image display device by way of a network.

According to another aspect of the present invention, a frame transmission interval control method that is carried out by an image display device that transmits a transmission request to each of a plurality of image transmission devices that each transmit differential data that indicate differences between images that are continuously displayed in time, that receives a frame that includes the differential data that each image transmission device transmitted in accordance with the transmission request, and that displays an image based on the differential data that is contained in the frame that is received, includes:

transmitting the transmission requests to each of the image display devices at a transmission interval that is set in advance; for each image transmission device, measuring a first required time interval from the start of transmission of the transmission request until the start of reception of the frame and a second required time interval from the start of reception until the end of reception of the frame, and changing the transmission interval of the transmission request based on a result of the measurement.

EXAMPLE EMBODIMENT

Example embodiments of the present invention are next described with reference to the accompanying drawings.

Figure 1:
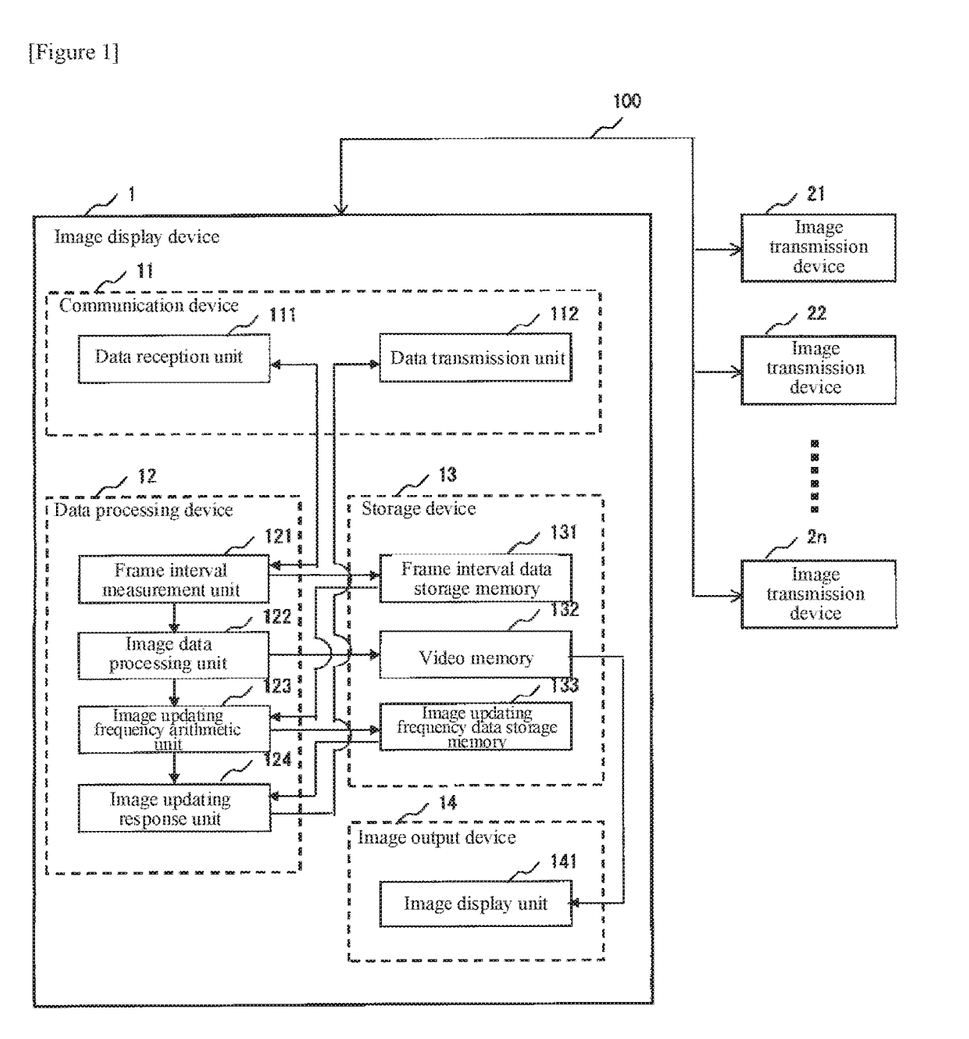
FIG. 1 is a block diagram showing the configuration of the image display device according to an example embodiment of the present invention.

FIG. 1 is a block diagram showing the configuration of an image display device according to an example embodiment of the present invention. Referring to FIG. 1, image display device 1 includes communication device 11, data processing device 12, storage device 13, and image output device 14.

Communication device 11 is communicably connected to a plurality of image transmission devices $2_1$-$2_n$ by way of network 100 and is provided with data reception unit 111 and data transmission unit 112. Data reception unit 111 receives data (including compressed image data) from each of image transmission devices $2_1$-$2_n$. Data transmission unit 112 transmits data (including transmission requests) to each of image transmission devices $2_1$-$2_n$.

In accordance with transmission requests, each of image transmission devices $2_1$-$2_n$, transmits to image display device 1 frames that include differential data that indicate the differences between images that are displayed on the screen in a time series. The differential data may be realized by image compression as described in Patent Document 2. Identification information that can identify the image transmission device is appended to the frames.

Data processing device 12 includes frame interval measurement unit 121, image data processing unit 122, image updating frequency arithmetic unit 123, and image updating response unit 124. Storage device 13 is provided with frame interval data storage memory 131, video memory 132, and image updating frequency data storage memory 133. Image output device 14 is provided with image display unit 141.

Frame interval measurement unit 121 measures, as frame interval data, a first required time interval that is required from the start of transmission of transmission requests until the start of reception of frames and a second required time interval (transmission time of frames) that is required from the start of reception of the frames until the end of reception for each of image transmission devices $2_1$-$2n$. Image data processing unit 122, image updating frequency arithmetic unit 123, and image updating response unit 124 can also be referred to as the control unit.

The control unit causes transmission requests to be sent from data transmission unit 112 to each image transmission device at a transmission interval that has been set in advance and causes frame interval measurement unit 121 to carry out measurement of the frame interval data for each image transmission device in the prescribed period. Here, the control unit may cause the operation of measuring the frame interval data to start by detecting that a predetermined input operation has been implemented in the console (not shown) of image display device 1 or by detecting that a predetermined time has arrived. The control unit then acquires the transmission state of frames based on the measurement results and changes the transmission interval of transmission requests that are transmitted by data transmission unit 112 in accordance with the transmission state.

More specifically, data reception unit 111 receives compressed image data from each of image transmission devices $2_1$-$2_n$ and supplies the compressed image data that was received to frame interval measurement unit 121. Frame interval measurement unit 121 produces frame interval data that includes the measurement results of the first and second required time intervals for each of image transmission devices $2_1$-$2_n$ and writes the created frame interval data to frame interval data storage memory 131. Frame interval measurement unit 121 then transfers the compressed image data from data reception unit 111 to image data processing unit 122.

Image updating frequency arithmetic unit 123 regularly reads frame interval data from frame interval data storage memory 131 for each of image transmission devices $2_1$-$2_n$ and carries out a calculation process for adjusting the image updating frequency in accordance with the state of use of network 100. Image updating frequency arithmetic unit 123 writes the image updating frequency data obtained from the calculation process to image updating frequency data storage memory 133 for each of image transmission devices $2_1$-$2_n$.

Image updating response unit 124 reads image updating frequency data from image updating frequency data storage memory 133 for each of image transmission devices $2_1$-$2_n$. Image updating response unit 124 then causes data transmission unit 112 to transmit transmission requests of the next image data on the basis of the image updating frequency data for each of image transmission devices $2_1$-$2_n$.

Display memory areas that correspond to each of image transmission devices $2_1$-$2_n$ are assigned in video memory 132. Image data processing unit 122, having implemented necessary processing such as decoding upon the compressed image data of each of image transmission devices $2_1$-$2_n$, writes the data to the corresponding display memory areas of video memory 132.

Image display unit 141 successively reads image data from video memory 132 and displays images. Image display unit 141 can display images of each of image transmission devices $2_1$-$2_n$. When the number of image transmission devices connected to image display device 1 is one, the display area of image display unit 141 is not divided. When the number of image transmission devices connected to image display device 1 is two or more, the display area of image display unit 141 is divided according to the number of image transmission devices. In other words, the display area of image display unit 141 is partitioned into a plurality of divided display areas according to each of image transmission devices $2_1$-$2_n$. The assignment of image transmission devices $2_1$-$2_n$ to divided display areas can be set as appropriate.

FIGS. 2A-2D give a schematic representation of examples of the division of the display area of image display unit 141.

Figure 2A:
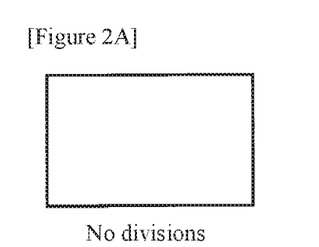
FIG. 2A is a schematic view showing an example of the division of display areas of an image display unit.
Figure 2B:
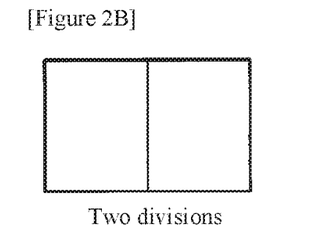
FIG. 2B is a schematic view showing another example of the division of display areas of the image display unit.

FIG. 2A shows an undivided state when the number of image transmission devices that are connected to image display device 1 is one. In FIG. 2B, the display area of image display unit 141 is partitioned into first and second divided display areas for a case in which the number of image transmission devices that are connected to image display device 1 is two (two divisions). The areas of the first and second divided display areas are the same.

Figure 2C:
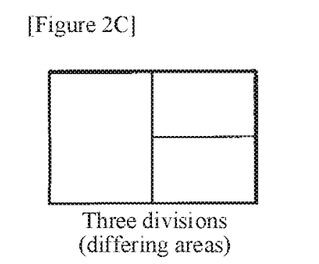
FIG. 2C is a schematic view of yet another example of the division of display areas of the image display unit.

In FIG. 2C, the display area of image display unit 141 is partitioned into first to third divided areas (three divisions) for a case in which the number of image transmission devices that are connected to image display device 1 is three. The areas of the first and second divided display areas are the same. The area of the third divided area is greater than the area of either of the first and second divided display areas. In other words, the resolution of the image data that are displayed in the third divided display area is higher than the resolution of the image data that are displayed in each of the first and second divided display areas.

Figure 2D:
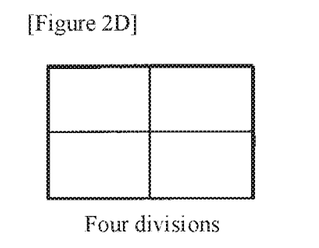
FIG. 2D is schematic view of yet another example of the division of display areas of the image display unit.

In FIG. 2D, the display area of image display unit 141 is partitioned into first to fourth divided display areas (four divisions) for a case in which the number of image transmission devices connected to image display device 1 is four. The areas of the first to fourth divided display areas are all the same.

Image display device 1 can be applied to, for example, a projector, a display device, or a monitor.

Details regarding the operation of image display device 1 are next described.

Normally, when differential data that show the differences of images are compressed and transmitted, variation occurs in the data transmission time per single frame. Further, various frame transmission states occur between image display device 1 and each of image transmission devices $2_1$-$2_n$. Image display device 1 adjusts the transmission interval (differential data transmission interval) of frames (differential data) that are transmitted from the image transmission devices by controlling the transmission timing of the transmission requests to the image transmission devices according to the frame transmission state for each of image transmission devices $2_1$-$2_n$.

The state of frame transmission and method of determining this state is first briefly described.

Frame transmission interval T and the number of frames transmitted per second F have the relation shown by the following Formula 1.

$$T=1/F, F=1/T \quad \text{(Formula 1)}$$

A state in which the image updating frequency is appropriate or a state in which the image updating frequency can be increased are given by the following Formula (2). Here, $T_M$ indicates the greatest frame transmission time (second required time interval) "s" within a unit time interval, and $T_D$ indicates the longest time interval of the first required time interval required from the start of transmission of transmission requests until the start of reception of frames within a unit time interval.

$$T_D+T_M<T \quad \text{(Formula 2)}$$

A state in which the image updating frequency must be decreased is given by the following Formula (3).

$$T_D+T_M>T, T_D<T \quad \text{(Formula 3)}$$

A state in which the image updating frequency is low and problems do not occur despite lowering the image updating frequency is given by the following Formula (4).

$$T_D+T_M>T, T_D>T \quad \text{(Formula 4)}$$

Formulas 1-4 shown above are used to determine whether a state is any of: "transmission state in which the frame transmission interval is appropriate," "frame transmission state in which the number of frames is inadequate," "frame transmission state in which the frames are too fast," and "frame transmission state in which the number of frames is excessive due to low screen updating frequency."

Figure 3A:
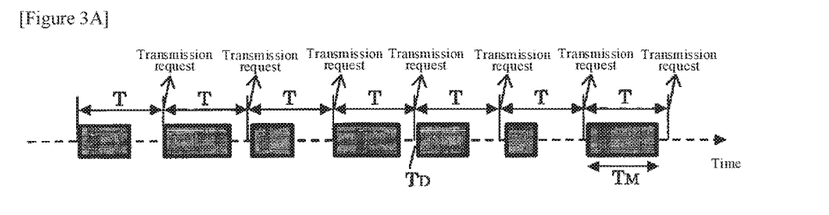
FIG. 3A is a schematic view of an example of the state of transmission of appropriate frame transmission intervals.
Figure 3B:
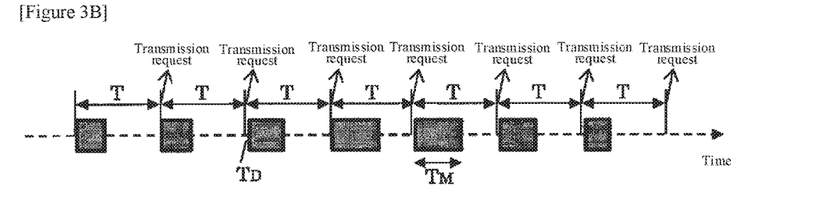
FIG. 3B is a schematic view showing an example of the state of frame transmission in which the number of frames is insufficient.
Figure 3C:
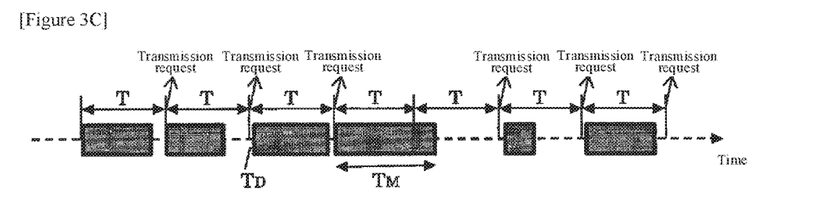
FIG. 3C is a schematic view showing an example of the state of frame transmission in which frames are too fast.
Figure 3D:
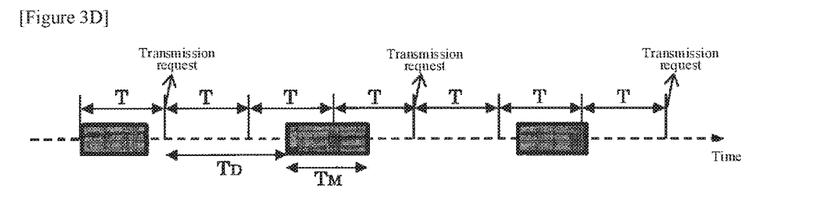
FIG. 3D is a schematic view of an example of the state of frame transmission in which the number of frames is excessive.

FIG. 3A shows an example of a transmission state in which the frame transmission interval is appropriate. FIG. 3B shows an example of a frame transmission state in which the number of frames is inadequate. FIG. 3C shows an example of a frame transmission state in which the frames are too fast. FIG. 3D shows an example of a frame transmission state in which the number of frames is excessive due to low screen updating frequency of the image transmission device.

In FIGS. 3A-3D, T indicates frame transmission intervals (corresponding to the transmission intervals of transmission requests). Frame transmission interval T is a value that is individually set between image display device 1 and each of image transmission devices $2_1$-$2_n$. Here, for example, $T_1$-$T_n$=0.066 [s] are set as the initial values. Further, the period of updating frame transmission intervals $T_1$-$T_n$ is set to 5 [s]. Image display device 1 adjusts the values of each frame transmission intervals (the transmission interval of transmission requests) $T_1$-$T_n$ according to the frame transmission state during a period of 5 [s].

The "transmission state in which the frame transmission interval is appropriate" shown in FIG. 3A is the ideal frame transmission state in which the bandwidth of network 100 is used to the maximum. The "transmission state in which the frame transmission interval is appropriate" is a state that satisfies the relation shown in above-described Formula 2, and moreover, is a state in which frame transmission interval $T_N$ that is given by the following Formula 5 matches the current frame transmission interval $T_K$.

$$F_i<1/(T_D+T_M) \le F_i+1, T_N=1/F_i \quad \text{(Formula 5)}$$

Figure 4:
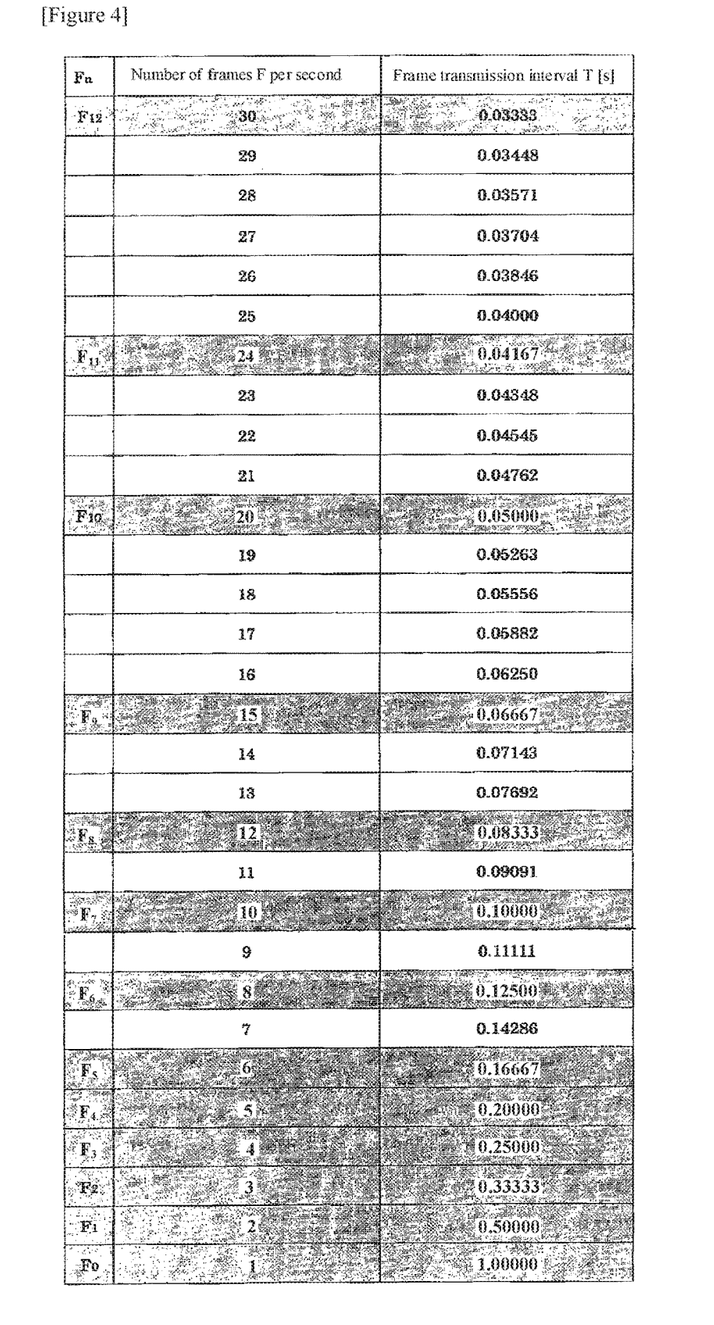
FIG. 4 is a view showing a table that indicates the frame transmission interval for each of the numbers of frames when the number of frames per unit time is discretely changed.

Here, $F_i$ is the number of transmission frames per second that is calculated on the basis of the table shown in FIG. 4. In the table shown in FIG. 4, numbers $F_0$-$F_{12}$ are set, and the number of transmission frames per second and the values of the frame transmission intervals are recorded for each of numbers $F_0$-$F_{12}$. The number of transmission frames of number $F_0$ is the minimum, and the number of transmission frames increases discretely with the number. In the example of FIG. 4, number $F_0$ is "1," and the numbers increase by "1" from number $F_2$ to number $F_5$ and increase by "2" from number $F_6$ to number $F_8$. The increase is "3" for number $F_9$, "5" for number $F_{10}$, "4" for number $F_{11}$, and "6" for number $F_{12}$.

In the above-described transmission state in which the frame transmission interval is appropriate, the frame transmission interval (transmission interval of transmission requests) does not need to be changed. Accordingly, image display device 1 sends transmission requests to all of image transmission devices $2_1$-$2_n$ for each frame transmission interval T (=0.066 [s]).

The "transmission state in which the number of frames is inadequate" shown in FIG. 3B is a state that satisfies the above-described Formula 2, and moreover, is a state in which frame transmission interval $T_N$ that is given by the above-described Formula 5 is smaller than the current frame transmission interval $T_K$. In this case, image display device 1 adjusts the transmission interval of transmission requests to become frame transmission interval $T_N$.

The "frame transmission state in which the frames are too fast" shown in FIG. 3C is a state that satisfies the above-described Formula 3. In this case, image display device 1 determines that the phenomenon of frame dropping has occurred one or more times in an image transmission device and adjusts the transmission interval of transmission requests to become frame transmission interval $T_N$ that is given by the above-described Formula 5.

The "frame transmission state in which the screen updating frequency of the image transmission device is low" shown in FIG. 3D is a state that satisfies the above-described Formula 4. In this case, image display device 1 is able to determine that the image from an image transmission device, in which the image updating frequency is low, is displayed at the appropriate timing. In addition, image display device 1 may adjust the transmission interval of the transmission requests to become the frame transmission interval $T_N$ given by the above-described Formula 5. However, although there is no visual effect when the same screen update frequency is continuous, the frame transmission interval sometimes cannot immediately keep up with the change when the screen update frequency from an image transmission device increases, and the frame transmission interval is therefore preferably not changed.

Using a table that causes discrete changes of the number F of image transmission frames per second such as shown in FIG. 4 can prevent frequent changes of frame transmission interval T. However, the present invention is not limited to this form. Any type of table may be used as long as the transmission interval of transmission requests can be adjusted according to the frame transmission state.

The operation of image updating frequency arithmetic unit 123 is next described.

Figure 5:
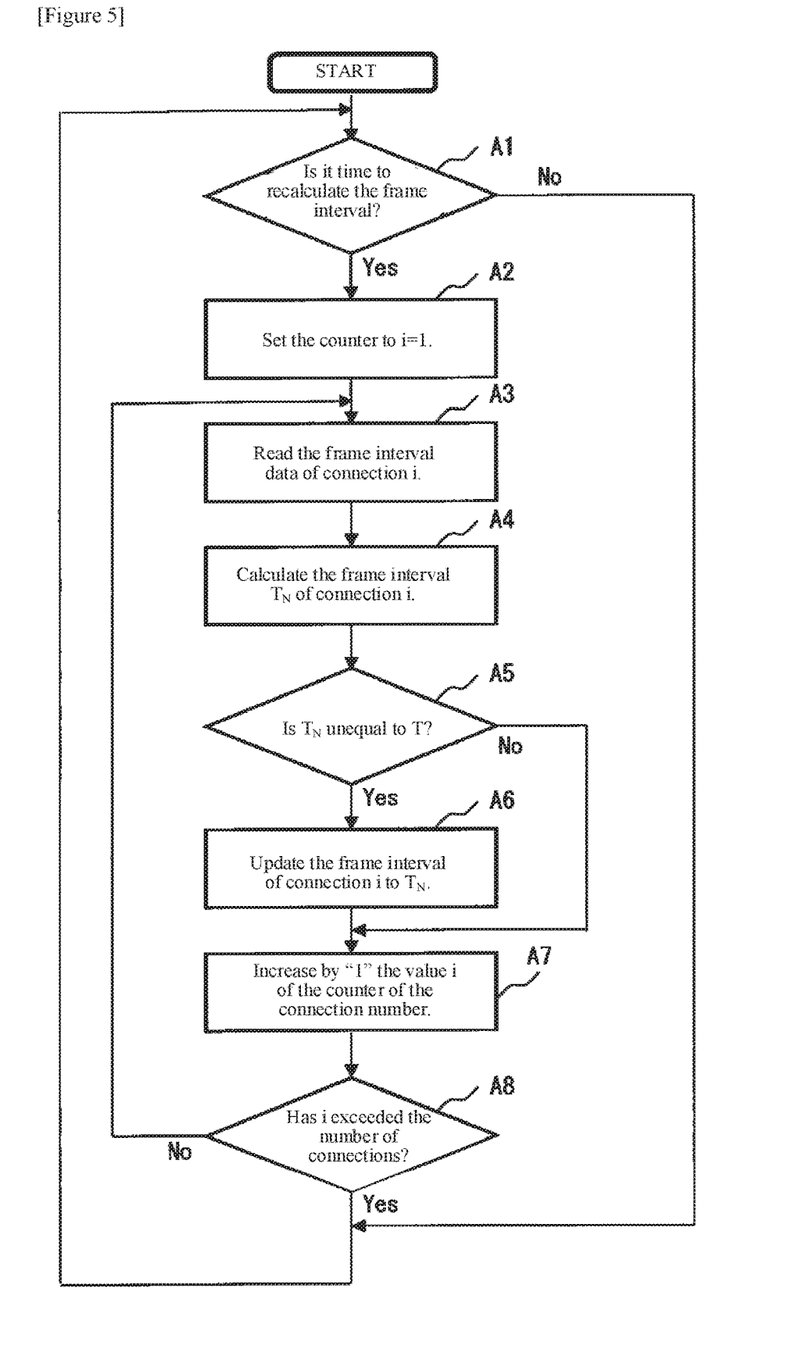
FIG. 5 is a flow chart for describing the process of calculating the frequency of image updating.

FIG. 5 is a flow chart for describing the image updating frequency arithmetic process of image updating frequency arithmetic unit 123. In this example, image updating frequency arithmetic unit 123 calculates the image updating frequency for each fixed time interval.

Image updating frequency arithmetic unit 123 determines whether the time has come for recalculating the frame transmission interval (Step A1).

If the time has come for recalculating the frame transmission interval, image updating frequency arithmetic unit 123 sets the counter to i=1 (Step A2). Here, the counter specifies the connection of image transmission devices $2_1$-$2_n$, and for example, "i=1" indicates the connection with image transmission device $2_1$.

Image updating frequency arithmetic unit 123 next reads the frame interval data (current frame transmission interval T, maximum frame transmission time $T_M$, and transmission request/frame transmission start maximum time interval $T_D$) of connection i from frame interval data storage memory 131 (Step A3). Image updating frequency arithmetic unit 123 next determines, on the basis of the frame interval data of connection i that was read, to which of the frame transmission states that were shown in FIGS. 3A-3D the frame transmission state of connection i pertains, and then calculates a new frame transmission interval $T_N$ of connection i (Step A4).

Image updating frequency arithmetic unit 123 next determines whether the new frame transmission interval $T_N$ differs from the original frame transmission interval T (Step A5). If frame transmission interval $T_N$ is different from frame transmission interval T, image updating frequency arithmetic unit 123 writes frame transmission interval $T_N$ to image updating frequency data storage memory 133 as the new frame transmission interval of connection i (Step A6). Image updating frequency arithmetic unit 123 then increases value i of the counter by "1" (Step A7). If frame transmission interval $T_N$ was determined to match frame transmission interval T in Step A5, the process of Step A7 is carried out without implementing the process of Step A6.

Finally, image updating frequency arithmetic unit 123 determines whether the value i of the counter has exceeded the number of connections (Step A8). If the value i of the counter has exceeded the number of connections, image updating frequency arithmetic unit 123 determines that processing has been carried out for all image transmission devices and again executes Step A1. If the value i of the counter has not exceeded the number of connections, image updating frequency arithmetic unit 123 determines that there is still an image transmission device for which the operation has not been executed and executes Step A3.

The actual configuration of image updating frequency arithmetic unit 123 is next described.

Figure 6:
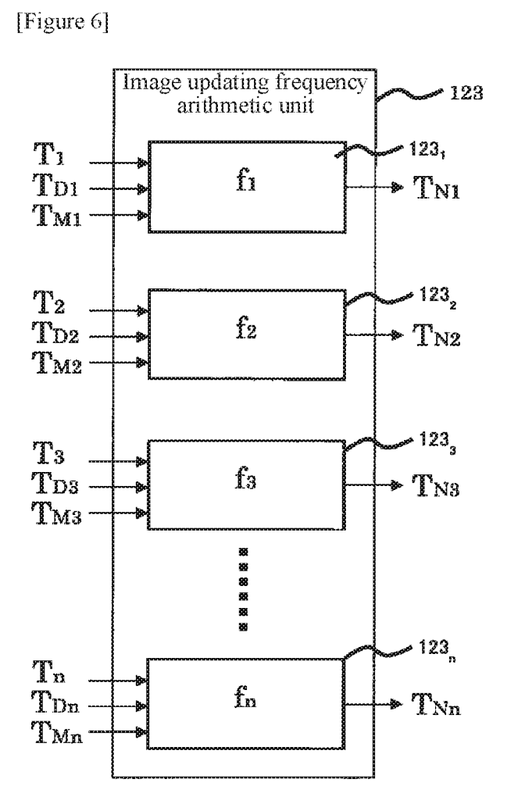
FIG. 6 is a block diagram showing the configuration of the image updating frequency arithmetic unit.

FIG. 6 is a block diagram showing the configuration of image updating frequency arithmetic unit 123. Referring to FIG. 6, image updating frequency arithmetic unit 123 includes function arithmetic units $123_1$-$123_n$. Function arithmetic units $123_1$-$123_n$ are provided corresponding to respective image transmission devices $2_1$-$2_n$.

Function arithmetic unit $123_n$ takes as input each of frame transmission interval $T_n$, maximum frame transmission time $T_{Mn}$, and transmission request/frame transmission start maximum time interval $T_{Dn}$, and based on these input values, uses function $f_n$ to calculate frame transmission interval $T_{Nn}$. Function $f_n$ distinguishes the frame transmission states shown in FIGS. 3A-3D. The other function arithmetic units $123_1$-$123_{n-1}$ are of the same configuration as function arithmetic unit $123_n$. The current frame transmission intervals $T_1, T_2, \ldots, T_n$ are replaced by new frame transmission intervals $T_{N1}, T_{N2}, \ldots, T_{Nn}$ by a single arithmetic processing operation of image updating frequency arithmetic unit 123 (the processing of Step A2-Step A8 shown in FIG. 5).

According to the image display device of the above-described present example embodiment, the following actions and effects are exhibited.

The optimum frame transmission intervals are individually determined according to the frame transmission states for each of image transmission devices $2_1$-$2_n$, and the transmission intervals of the transmission requests are adjusted to become these optimum frame transmission intervals. As a result, the utility of the bandwidth of network 100 can be maximized without waste and differential data can be transmitted smoothly at a fixed period.

Further, the updating of images that are displayed in divided display areas on the screen of an image display device can be synchronized with change of the images that are displayed on the image transmission devices. As a result, any perception of an unnatural display can be suppressed when observing the display image on the image transmission device side and the displayed image on the image display device side.

When network 100 having narrow bandwidth is used in a mode of use such as a conference and the processing capabilities of the information processing terminals of each participant differ, cases will occur in which the amount of data transmission increases for information processing terminals having high processing capabilities while the frame transmission interval of information processing terminals having lower processing capabilities changes. According to the image display device of the present example embodiment, by repeatedly executing the calculation process shown in FIG. 5 for each individual information processing terminal, the frame transmission interval of each information processing terminal converges on the optimum interval.

For example, in a single calculation process operation of image updating frequency arithmetic unit 123, even in a case in which only the frame transmission interval $T_k$ of a particular image transmission device k is replaced by a new frame transmission interval $T_{Nk}$, and the frame transmission intervals of the other image transmission devices remains unchanged, the effect of frame transmission interval $T_k$ of image transmission device k that was changed in the previous operation will be applied upon the operations of the frame transmission intervals for other image transmission devices in the following operations of image updating frequency arithmetic unit 123. As a result, the frame transmission intervals of all image transmission devices are automatically adjusted to become the optimum frame transmission intervals according to the frame transmission states.

In the image display device of the present example embodiment, the above-described configuration and operation can be modified as appropriate.

For example, when the area ratios of the divided display areas of the display screen of image display device 1 differ, the control unit of image display device 1 may cause information that indicates resolution that accords with the area ratio of the divided display areas to be transmitted together with a transmission request from data transmission unit 112 to each image transmission device. In this case, each image transmission device transmits differential data of images that accords with the resolution that is received together with the transmission request.

More specifically, in the example of the three divisions shown in FIG. 2C, the resolution of the image data displayed in the third divided display area is higher than the resolution of the image data that is displayed in each of the first and second divided display areas. The control unit transmits to the image transmission device, that corresponds to the third divided display area, transmission requests to which is appended information that indicates higher resolution than for the image transmission devices that correspond to the first and second divided display areas, thereby enabling adjustment of the data transmission intervals that accords with the area ratio of the divided display areas.

In addition, the present invention can adopt the form described in the following SUPPLEMENTARY NOTES 1-6 but is not limited to these forms.

[Supplementary Note 1]

An image display device that is communicably connected by way of a network to a plurality of image transmission devices that each transmit differential data that indicate the differences between images that are displayed continuously in time includes:

a communication unit that transmits a transmission request to each of the plurality of image transmission devices and that receives a frame that includes the differential data that is transmitted by each image transmission device in accordance with the transmission request;

a display unit that displays an image based on the differential data that is contained in the frame that is received from each of the image transmission devices;

a measurement unit that, for each of the image transmission devices, measures a first required time interval that is required from the start of transmission of the transmission request until the start of reception of the frame and a second required time interval that is required from the start of reception until the end of reception of the frame; and a control unit that controls the a transmission operation of the transmission request of the communication unit;

wherein the control unit causes transmission of the transmission request from the communication unit to each of the image transmission devices at a transmission interval that has been set in advance, causes the measurement unit to carry out measurement of the first and second required time intervals for each of the image transmission devices, and changes the transmission interval of the transmission request based on a result of the measurement.

[Supplementary Note 2]

In the image display device as described in SUPPLEMENTARY NOTE 1, the control unit causes the measurement unit to carry out the measurement of the first and second required time intervals over a predetermined period for each of the image transmission devices and then sets the transmission interval of the transmission request to an optimum frame transmission interval that is calculated based on the number of frames per unit time that is indicated by a reciprocal of a value obtained by adding the maximum values of the measured values of each of the first and second required time intervals.

[Supplementary Note 3]

The image display device described in SUPPLEMENTARY NOTE 1 or 2 further includes:

a table that indicates a frame transmission interval for each of the numbers of frames when the number of frames per unit time is changed discretely;

and the control unit refers to the table to determine the optimum frame transmission interval.

[Supplementary Note 4]

In the image display device described in any one of SUPPLEMENTARY NOTES 1 to 3:

the display unit is provided with a display screen, the display screen is partitioned into a plurality of divided display areas that correspond to each of the plurality of image transmission devices; and the image based on the differential data that is contained in the frame received from each of the image transmission devices is displayed in a corresponding divided display area; and the control unit causes information that indicates resolution that accords with the area ratio of the divided display areas of the display screen to be transmitted together with the transmission request from the communication unit to each image transmission device.

[Supplementary Note 5]

An image display system includes:

the image display device described in any one of SUPPLEMENTARY NOTES 1 to 4; and a plurality of image transmission devices that are communicably connected to the image display device by way of a network.

[Supplementary Note 6]

A frame transmission interval control method that is carried out by an image display device that transmits a transmission request to each of a plurality of image transmission devices that each transmit differential data that indicate differences between images that are continuously displayed in time, that receives a frame that includes the differential data that each image transmission device transmitted in accordance with the transmission request, and that displays an image based on the differential data that is contained in the frame that is received includes:

transmitting the transmission request to each of the image transmission devices at a transmission interval that is set in advance; for each image transmission device, measuring a first required time interval from the start of transmission of the transmission request until the start of reception of the frame and a second required time interval from the start of reception until the end of reception of the frame; and changing the transmission interval of the transmission request based on a result of the measurement.

EXPLANATION OF REFERENCE NUMBERS

1 Image display device
11 Communication device
12 Data processing device
13 Storage device
14 Image output device
$2_1$-$2_n$ Image transmission device
121 Frame interval measurement unit
122 Image data processing unit
123 Image updating frequency arithmetic unit
124 Image updating response unit
131 Frame interval data storage memory
132 Video memory
133 Image updating frequency data storage memory
141 Image display unit

The invention claimed is:

1. An image display device comprising:
a communication unit that transmits a transmission request to each of a plurality of image transmission devices and that receives a frame that includes a differential data that is transmitted by each image transmission device in accordance with said transmission request, said differential data indicating differences between images that are displayed continuously in time;
a display unit that displays an image based on said differential data that is contained in said frame that is received from each of said image transmission devices;
a measurement unit that, for each of said image transmission devices, measures a first required time interval that is required from a start of transmission of said transmission request until a start of reception of said frame and a second required time interval that is required from the start of reception of said frame until an end of reception of said frame; and a control unit that controls a transmission operation of said transmission request of said communication unit;

wherein said control unit causes transmission of said transmission request to each of said image transmission devices from said communication unit at a transmission interval that has been set in advance, causes said measurement unit to carry out measurement of said first and second required time intervals for each of said image transmission devices, and changes the transmission interval of said transmission request based on a result of said measurement.

2. The image display device as set forth in claim 1, wherein said control unit causes said measurement unit to carry out measurement of said first and second required time intervals over a predetermined period for each of said image transmission devices and then sets the transmission interval of said transmission request to an optimum frame transmission interval that is calculated based on a number of frames per unit time that is indicated by a reciprocal of a value obtained by adding the maximum values of the measured values of each of said first and second required time intervals.

3. The image display device as set forth in claim 1, further comprising:

a table that indicates a frame transmission interval for each of the numbers of frames when the number of frames per unit time is changed discretely;

wherein said control unit refers to said table to determine said optimum frame transmission interval.

4. The image display device as set forth in claim 1, wherein:

said display unit is provided with a display screen; the display screen is partitioned into a plurality of divided display areas that correspond to each of said plurality of image transmission devices; and the image based on the differential data that is contained in said frame received from each of said image transmission devices is displayed in a corresponding divided display area; and said control unit causes information that indicates resolution that accords with the area ratios of said divided display areas of said display screen to be transmitted together with said transmission request from said communication unit to each image transmission device.

5. An image display system comprising:

the image display device as set forth in claim 1; and said plurality of image transmission devices that are communicably connected to said image display device by way of a network.

6. A frame transmission interval control method comprising:

transmitting a transmission request to each of a plurality of image transmission devices at a transmission interval that is set in advance;

receiving a frame that includes a differential data that is transmitted by each image transmission device in accordance with said transmission request, said differential data indicating differences between images that are displayed continuously in time;

for each said image transmission device, measuring a first required time interval from a start of transmission of said transmission request until a start of reception of said frame and a second required time interval from the start of reception of said frame until an end of reception of said frame; and changing the transmission interval of said transmission request based on a result of said measurement.

\* \* \* \* \*